United States Patent

[11] 3,598,282

| [72] | Inventors | Henry A. Phillips<br>1340 New Brunswick Ave., Piscataway,<br>N.J. 08854;<br>Reynold E. Minnich, 1309 Washington<br>Valley Road, Martinsville, N.J. 08836 |
|---|---|---|
| [21] | Appl. No. | 879,677 |
| [22] | Filed | Nov. 25, 1969 |
| [45] | Patented | Aug. 10, 1971 |

[54] APPARATUS FOR MELTING AND FEEDING SOLIDIFIED MATERIAL
18 Claims, 3 Drawing Figs.

[52] U.S. Cl. .................................................. 222/146 HE,
                                                13/6, 219/427
[51] Int. Cl. .................................................. B67d 5/62,
                                                F27b 14/06
[50] Field of Search .......................................... 219/421,
        426, 427; 13/31, 6; 118/49—49.5; 263/10, 98;
                                126/284, 343.5; 222/146 HE

[56] References Cited
UNITED STATES PATENTS
2,201,655  5/1940  Srodulski...................... 222/146

| 2,809,772 | 10/1957 | Weisz | 222/146 |
| 2,815,429 | 12/1957 | Weisz | 219/421 |
| 3,032,635 | 5/1962 | Kraft | 219/426 |
| 3,056,846 | 10/1962 | Glazer | 13/6 |
| 3,277,276 | 10/1966 | Nichol et al. | 219/421 |

*Primary Examiner*—Volodymyr Y. Mayewsky
*Attorney*—Lerner, David & Littenberg

ABSTRACT: Apparatus for melting solidified material and feeding the resultant liquid including a vertically disposed hopper for receiving the solidified material and heating means for melting the solidified material. The heating means comprises a heating member disposed across the bottom of the hopper and shaped to promote flow of the liquid towards its outer perimeter where liquid passage means receive the liquid as it flows over the outer perimeter. The heating means may also comprise means for applying a greater amount of heat to the lower portion of the heating member disposed adjacent the liquid passage means than to the remaining top portion of the heating member to promote liquid flow along the upper surface of the heating member and prevent liquid flow along paths through the solid material.

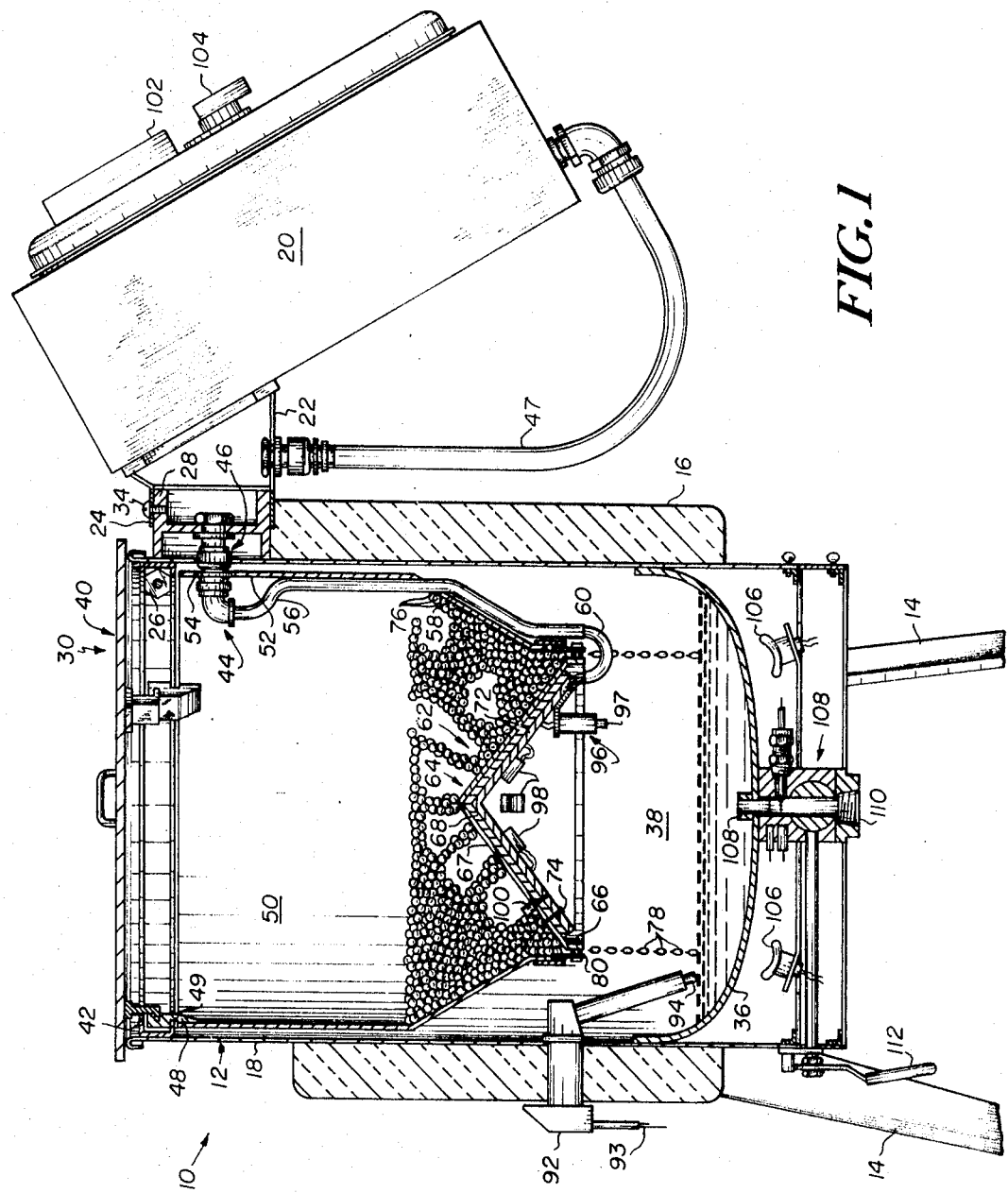
FIG.1
INVENTORS:
HENRY A. PHILLIPS
REYNOLD E. MINNICH
BY 
LERNER, DAVID & LITTENBERG
ATTORNEYS

PATENTED AUG 10 1971

INVENTORS:
HENRY A. PHILLIPS
REYNOLD E. MINNICH
BY
LERNER, DAVID & LITTENBERG
ATTORNEYS 3,598,282

APPARATUS FOR MELTING AND FEEDING SOLIDIFIED MATERIAL

BACKGROUND OF THE INVENTION

This invention relates to a method and apparatus for melting solidified material and feeding the resultant liquid to a collecting chamber, metering means, mixing means, dispensing equipment, etc. This invention has wide application in situations where materials to be utilized in the liquid state are supplied to the user in the solid state. Apparatus for melting solidified material and feeding the resultant liquid are known as evidenced by U.S. Pat. Nos. 2,773,496; 2,809,772 and 3,032,635.

Though the invention is capable of wide application as indicated hereinabove, it will generally be described hereinafter with reference to the problems encountered when handling MOCA (DuPont Registered Trademark) which is a curing agent for liquid urethane elastomers, epoxy resins, and blends of liquid urethane polymers and epoxy resins. Its chemical composition is "4, 4' methylenebis (2-chloraniline)." MOCA is sold in solid state form as pellets which must be melted for processing. MOCA cannot be kept in the liquid state at too elevated a temperature for too long a time without detrimental effects on its vulcanizate properties. Further, it is quite toxic and will decompose at approximately 400° F. (204° C.) and once decomposition commences, it is exothermic and becomes self-sustaining. For this reason, it is recommended by the manufacturer that a processing temperature of 295° F. (140° C.) be considered a maximum operating temperature even for short term exposure. Since its melting range is from 212° to 228° F. (100° to 109° C.), it is usually processed at temperatures between 240° and 250° F. (116° to 121° C.).

It is an object of this invention to provide an improved method and improved apparatus for melting solidified material and feeding the resultant liquid to a utilization means. It is a further object of this invention to provide such a method and apparatus for melting solidified material, which material preferably should not be heated above a certain temperature, at a faster rate than previously possible to provide both a faster start up time and greater volume flow.

SUMMARY OF THE INVENTION

According to the invention, there is provided apparatus for melting solidified material and feeding the resultant liquid which apparatus comprises a vertically disposed hopper for receiving the solidified material, a heating member disposed across the bottom of the hopper for melting the solidified material, the heating member being shaped to promote fluid flow towards its outer perimeter, and liquid passage means disposed adjacent the outer perimeter of the heating member for receiving liquid flowing over the outer perimeter. The provision of a heating member shaped to promote fluid flow towards its outer perimeter, i.e. a member having an upper surface or surfaces sloped downwardly towards the inner wall of the hopper, results in a larger volume liquid flow than heretofore possible with a similar sized hopper. It is believed that this is due to the fact that a heating member shaped to promote liquid flow towards its outer perimeter presents a larger heating surface than would a flat member, collection of fluid in any one or more places is avoided, and the resultant liquid is removed as soon as it reaches the heating member outer perimeter. The prevention of the collection of liquid in puddles or the like is important in that once the material is changed to its liquid state, unduly excess additional heat is not wasted in further heating the liquid and, where it is important to avoid heating the liquid to a predetermined high temperature, the temperature of the liquid can be maintained below the aforesaid high temperature.

In accordance with a further feature of the invention, the liquid passage means are defined by a flangelike member which surrounds the outer perimeter of the bottom of the heating member and defines a liquid passage therewith. This permits the liquid to be quickly removed and has therefore resulted in an increased melting rate. In accordance with a still further feature of the invention, the flangelike member is itself heated to further increase the melting rate. Yet another feature of the invention resides in the feature of providing a depending flange portion depending from the outer perimeter of the bottom of the heating member and spaced from the flangelike member to define a liquid passage therebetween. The flangelike member and the depending flange portion terminate at different vertical positions to provide an uneven exit gap from the liquid passage to reduce the surface tension between the liquid and the inner surfaces of the liquid passage.

There is further provided according to the invention a method for melting solidified material and feeding the resultant liquid including the steps of disposing the solidified material in a vertical hopper, melting the solidified material by heating a surface of a heating member positioned across the bottom of the hopper and shaped to promote liquid flow towards its outer periphery, and supplying more heat to material disposed adjacent to a bottom portion of the heating surface than to material disposed adjacent to the remainder of the surface to promote liquid flow in paths along the heating surface. A further feature of the method of the invention resides in initially melting material disposed adjacent the bottom portion of the heating surface prior to melting of material disposed adjacent the remaining upper portion of the heating surface.

BRIEF DESCRIPTION OF THE DRAWINGS

FIG. 1 is a side elevational view of apparatus for melting solidified material and feeding the resultant liquid in accordance with the present invention in which the melter itself is shown in cross section;

DESCRIPTION OF THE PREFERRED EMBODIMENT

Figure 2:
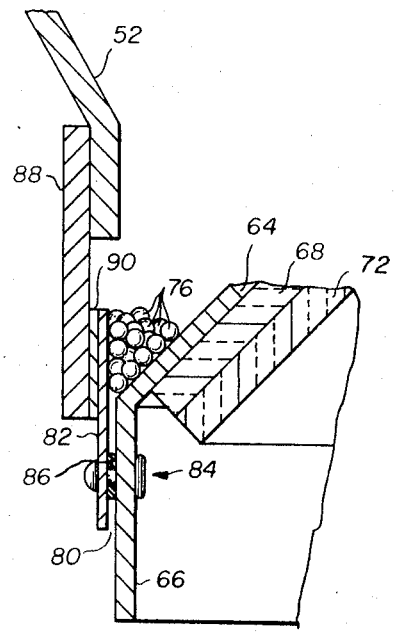
FIG. 2 is a cross-sectional view of a portion of the apparatus of FIG. 1.

Referring to the drawings, a preferred embodiment of a melter 10 in accordance with the present invention is shown in FIG. 1. The melter 10 generally comprises a tank 12 supported in a vertical position by three equally spaced supporting legs 14 (only two of the legs are shown). Insulating material 16 surrounds a portion of the outer area of the sidewall 18 of the tank 12. A suitable cover (not shown) also is provided for hermetically sealing the tank 12. Though the melter 10 can be used as an open melter, the cover must be employed when it is desired to pressurize the interior of the tank 12 to force feed liquid therefrom and when melting material which gives off noxious fumes.

A control panel 20 is rigidly connected to and supported by a bracket 22 fastened to the back of the panel. An annular projecting member 24 is welded to the back of the bracket 22 and is rigidly connected to annular support member 28 by means of screws 34 (only one being shown). The annular support member 28 is welded to the outside surface of the tank sidewall 18.

A liquid receptacle forming member 36 is welded to the inner surface of the tank sidewall 18 to form a liquid collecting chamber 38 in the lower portion of the tank 12. An integral hopper and heater assembly 40 is positioned in the tank 12 above the collecting chamber 38. The integral assembly 40 includes a hopper support ring 42 for mounting the assembly 40 in a desired position within the tank 12. The hopper support ring 42 has an outside diameter which can be expanded slightly greater than the inside diameter of the tank 12 by turning nut 26 and thereby located at a desired predetermined distance from the top of the tank 12. A positioning plate 30 is used to lower the integral assembly 40 into the tank 12 to the said desired predetermined distance from the top. The plate 30 is triangularly shaped thereby permitting the access of a tool to tighten the nut 26. This relatively precise positioning is essential to the coupling of an electrical heater control assembly 44 to an electrical coupling assembly 46 attached to the tank sidewall 18 and passing therethrough. The electrical coupling assembly 46 is electrically connected via a wire containing coupling conduit 47 to the circuitry of the control box 20.

The hopper support ring 42 facilitates the removal of the integral assembly 40 and the insertion of the integral assembly 40. To effect such removal, the coupling between the heater control assembly 44 and the coupling assembly 46 is disconnected, the nut 26 is loosened, and the integral assembly 40 is removed by gripping of the hopper support ring 42 and movement of the integral assembly 40 vertically out of the tank 12. Insertion of the integral assembly 40 is effected by coupling the removable positioning plate 30 to hanger member 48 and lowering it into the tank 12 until the positioning plate 30 comes to rest on top of tank 12 and then coupling the heater control assembly 44 of the coupling assembly 46.

The integral assembly 40 includes hanger members 48 (only one being shown) welded to the inner surface of the wall 52 of a hopper 50. The heater control assembly 44 is attached to the wall 52 of the hopper and passes through an opening 54 in the wall 52 disposed adjacent the electrical coupling assembly 46. A conduit 56 is connected to the heater control assembly 44 and passes through a further opening 58 in the wall 52. The conduit 56 terminates below the bottom of the wall 52 where wires 60 exit therefrom and are attached to the bottom of a heater assembly 62.

Figure 3:
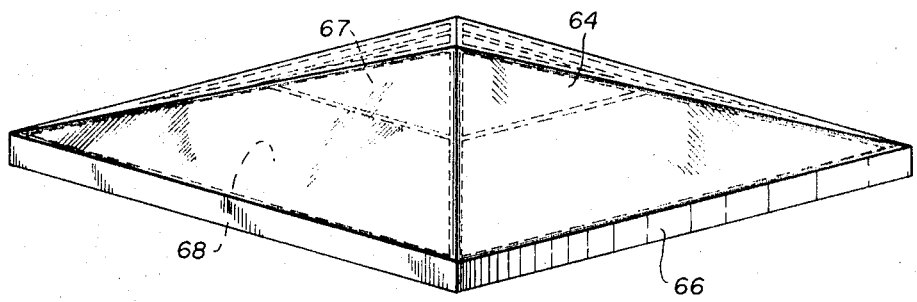
FIG. 3 is a prospective view of the heating member of the apparatus of FIG. 1.

The heater assembly 62 includes a pyramid-shaped heater member 64 having a depending flange portion 66 depending from the base perimeter of the pyramid. Resistance heating pads 67 and 68 are disposed adjacent the back surfaces of the sides of the pyramid formed by the heater member 64. There are a pair of such pads 67 and 68 for each pyramid side surface with the topmost pad 68 having an approximately triangular shape and the lowermost pad 67 having an approximately trapezoidal shape as can best be seen in FIG. 3 where the pads 67 and 68 are shown in phantom.

Disposed beneath the heating pads 67 and 68 is a support member 72 which is connected to the heater member 64 by means of fasteners 74 (only one being shown). The heater member 64 is preferably made of metal, such as aluminum. When the support member 72 is also made of metal, such as aluminum, heat conductive fasteners 74 are preferably employed to aid in conducting heat away from the support member 72 to the heater member 64. It has been found desirable to have a low mass heater assembly to insure rapid response of melting surface in applying and removing heat. The provision of heat conductive fasteners 74 causes the heater member 64 to act as a heat sink when the temperature of the support member 72 exceeds that of the heater member 64 which heat is passed to the solidified material, such as the illustrated pellets 76, in the hopper 50.

It should be appreciated that the solidified material may take many forms, such as powders, chunks, complete solid forms such as cylinders, pellets, such as the illustrated pellets 76, etc. As the material 76 melts, it is desired that the resultant liquid 78 will flow downwardly adjacent the upper surface of the heater member 64 and through liquid passages 80 to the collecting chamber 38.

However, it has been found that when melting commences, some of the liquid 78 formed near the top of the heater member 64 moves along paths through the pellets 76 and cools returning to the solid state. The thus cooled material connects adjacent pellets together to form a rigid "bridge" which supports the pellets above the bridge producing an air gap near the bottom of the heater member 64 between the bridge and the heater member 64. When this occurs the melting rate is reduced since the melting area, area of contact with the heater member 64, is reduced.

The liquid passages 80 are formed by a flangelike member 82 of metallic material which surrounds and is spaced from the bottom of the pyramid-shaped heater member 64. The flangelike member 82 is connected to the depending flange portion 66 by means of heat conductive fasteners 84. A heat conductive washer 86 is disposed between the flangelike member 82 and the depending flange portion 66 to space the flangelike member and depending flange portion a predetermined distance apart to form the liquid passages 80 therebetween. The spacing is such that the solid material 76 cannot pass between the walls of the liquid passage 80 while relatively unobstructed liquid flow is accommodated.

It is a feature of this invention that the flangelike member 82 is heated by means of the heat passing from the heater member 64 through the heat conductive fasteners 84 to melt material 76 contacting the inner surface of the flangelike member 82. This aids in breaking down any bridges which are formed to return the solid material 76 to the surface of the heater member 64 for more efficient melting thereof. It has further been found that a faster melting rate can be achieved by utilizing a flangelike member 82 which terminates at a different vertical position than does the depending flange portion 66. If they terminate at the same exit position, the liquid 78 flowing therebetween experiences large surface tension forces which tend to hold the liquid 78 and dam up the gap. This damming effect is believed to also cause liquid flow paths above the gap and subsequent cooling and solidification.

Referring more specifically to FIG. 2, the flangelike member 82 is connected to the hopper wall 52 by a heat insulating member 88. A further heat insulating member 90 connects the flangelike member 82 to the heat insulating member 88 and is of a size determined by the desired spacing between the flangelike member 82 and the depending flange portion 66. In this regard, it will be noted that the flangelike member 82 is thinner than the depending flange 66 and therefore easier to bring to the melting temperature of the material 76.

Returning to FIG. 1, it will be noted that various controls, which are well known, are provided. There is a liquid level control knob 92 which controls the position of a liquid level probe 94 for controlling the level of liquid kept in the collecting chamber 38. When working with MOCA (DuPont Registered Trademark), it is desired that the reservoir of liquid MOCA be kept at as small a level as possible while providing sufficient liquid MOCA for initial startup of the apparatus when liquid MOCA is needed in the processing operation which is to be fed by the present apparatus. Thus, it is desired that the liquid level be as low as possible since degradation will occur if the MOCA is kept for extended periods in the liquid state while, conversely, it is desired that the liquid level be high enough to insure that there will be sufficient liquid MOCA to supply the processing equipment when called for and until melting of the solid material 76 commences. The liquid level probe 94 determines this level by appropriate well known control means which causes the heater assembly 62 to turn on whenever the liquid level falls below the liquid level probe 94. There is also provided a safety liquid level control 96 which causes the heater assembly 62 to turn off when the liquid level reaches the liquid level safety probe 97.

There is further provided heat-sensing thermisters 98 for sensing the temperature of the supporting member 72 and thermocouples 100 (only one being shown) for sensing the temperature of the upper surface of the heater member 64. Suitable well known controls are connected via the wires 60 and the wires 93 leading from the liquid level control knob 92 to the control box 20 for insuring that proper temperatures and a desired liquid level are maintained. In this regard, the control box 20 comprises appropriate meters 102 and switches 104, and a protective sheath 99, such as a polytetrafluoroethylene sheath, is provided to protect the wires 60 from the melted liquid 78.

Infrared heating members 106 are also provided for maintaining the liquid in the collecting chamber 38 in the liquid state. In addition, suitable well known controls (not shown) are provided for insuring that the temperature of the liquid in the collecting chamber stays within a desired temperature range. A conventional ball valve assembly 108 and sediment tube 110 is provided at the bottom of the collecting chamber 38 and leads to an outlet 110 for connection to further feeding means for feeding the liquid to its desired end use. The ball valve assembly can be manually turned on and off by the valve handle 112. The melter 10 can be used to feed a continuous type of operation or an intermittent type of operation.

According to a further feature of the invention, more heat is supplied to the portions of the heater member 64 disposed adjacent the heater pad 67 than to the portions of the heater member 64 disposed adjacent the heating pads 68. The distribution of the heat is such that the temperature of the lower portion of the heating surface of the heating member is kept at approximately the same temperature as the upper portion of the heating surface. It is believed that more heat is required at the bottom portion of the heater member 64 to effect such equalization due to the fact that more heat is lost from the bottom portion to the material 76 or liquid 78 as the liquid 78 flows rapidly away from the bottom surface. Also, additional heat is required to heat the flangelike member 82 to the same approximate temperature.

If the material 76 is not of the type which requires that it be insured that it is not raised above a critical temperature, a large amount of heat could be supplied equally to the heating member 64 which would heat the total surface of all portions thereof to at least a temperature as high as the melt temperature of the material 76. When dealing with MOCA, however, it is desired that the surface temperature of the upper surface of the heater member 64 be kept between 235° and 250° F. (113° and 121° C.). To achieve such uniformity, it has been found, in accordance with this invention, necessary to supply more heat to the bottom of the heater member 64 than to the top of the heater member 64. In a test installation, it was found that heating pads 68 rated at 10 watts per square inch and heating pads 67 rated at 2.5 watts per square inch resulted in an even temperature across the entire upper surface of the heater member 64 of approximately 240° F. (116° C.).

When utilizing heating pads 67 and 68 in which the wattage of the lower pads 68 is much more than that of the upper pads 67, solidified material 76 adjacent the lower portions of the heater member 64 begins to melt prior to melting of material 76 adjacent the upper portions of the heater member 64. This initial melting at the bottom of the pyramid has been found to further increase the liquid flow rate in that any bridges which have been built up in prior use are broken down quite quickly permitting for liquid flow along the surface of the heater member 64. It appears that as long as sufficient liquid flow paths are provided along the surface of the heater member 64, liquid flow paths through the material 76 will not occur. Further, the initial melting at the lower portions of the heater member 64 provide ready flow paths for liquid subsequently formed adjacent the upper portions of the member 64.

In an actual test installation, it was found that the provision of an uneven gap at the exit of the liquid passages 80 increased the liquid flow rate, heating of the flangelike member 82 further increased the liquid flow rate, the distribution of the heat resulted in a still faster liquid flow rate, and the effect of bringing the lower surface portions to melt temperature prior to the upper surface portions still further increased the liquid flow rate.

Though the invention has been described in connection with a specific embodiment thereof and the handling of a specific material, it will be appreciated that many modifications and changes can be effected within the spirit and scope of the invention so that it is understood that the foregoing description is not made by way of limitation but only by way of example.

We claim:

1. In apparatus for melting solidified material and feeding the resultant liquid, said apparatus comprising a vertically disposed hopper for receiving the solidified material, electrical heating means for melting the solidified material including a heating member disposed across the bottom of the hopper, and liquid passage means for receiving and removing the liquid from the bottom of the hopper, the improvement that the heating member is shaped to promote downward flow of the liquid towards its lower outer perimeter, the liquid passage means are positioned to receive liquid passing over the said heating member lower outer perimeter, said liquid passage means comprises a flangelike member displaced from and surrounding the said heating member outer perimeter, said flangelike member and said outer perimeter defining said liquid passage means, and said electrical heating means includes means for heating said flangelike member.

2. Apparatus according to claim 1, wherein the electrical heating means includes means for applying more heat to a lower portion of the heating member than to the remaining upper portion of the heating member.

3. Apparatus according to claim 2, wherein the heating member is triangularly shaped in cross section.

4. Apparatus according to claim 3, wherein a collecting chamber is disposed below the heating member for receiving liquid leaving the liquid passage means, and the electrical heating means includes means for heating the liquid disposed in the collecting chamber to maintain it in its liquid state.

5. Apparatus according to claim 1, comprising supporting means connecting the flangelike member to the hopper and including insulating means for thermally insulating the flangelike member from the hopper.

6. Apparatus according to claim 1, wherein the means for heating the flangelike member comprises fastening means made of heat conductive material and connecting the flangelike member to the said heating member outer perimeter at a desired distance therefrom.

7. Apparatus according to claim 1, wherein the said heating member outer perimeter comprises a depending generally vertically disposed flange portion, said flangelike member is disposed generally in parallel with said depending flange portion, and the bottoms of the flangelike member and the depending flange portion terminate at different vertical positions.

8. Apparatus according to claim 1, wherein the heating means includes means for applying more heat to a lower portion of the heating member than to the remaining upper portion of the heating member.

9. Apparatus according to claim 6, wherein the electrical heating means includes means for applying more heat to a lower portion of the heating member than to the remaining upper portion of the heating member.

10. In apparatus for melting solidified material and feeding the resultant liquid, comprising a vertically disposed hopper for receiving the solidified material, electrical heating means for melting the solidified material including a heating member disposed across the bottom of the hopper, and liquid passage means for receiving and removing the liquid from the bottom of the hopper, the improvement that:
   a. the heating member is a pyramid-shaped bottomless member positioned with its apex approximately centrally of the hopper and its sides sloping downwardly towards the inner wall of the hopper;
   b. said liquid passage means includes a flangelike member and means mounting said member adjacent to and surrounding the lower outer perimeter of said pyramid-shaped member at a desired distance therefrom to define a liquid passage of a desired width therebetween; and
   c. said electrical heating means includes means for heating the outer surfaces of said pyramid-shaped member and the inner surface of said flangelike member to melt solidified material contacting said surfaces.

11. Apparatus according to claim 10, wherein the electrical heating means comprises means for supplying more heat to lower portions of the surfaces of the sides of said pyramid-shaped member than to the remaining upper portions of said side surfaces.

12. Apparatus according to claim 10, wherein said electrical heating means includes a pair of heating pads disposed adjacent the lower surface of each side of said pyramid-shaped member, each said pair including an approximately triangularly shaped pad for heating an upper surface portion and an approximately trapezoidally shaped pad for heating the remaining lower surface portion, and means for supplying more heat to the said lower surface portions via said approximately trapezoidally shaped pads than to the said upper surface portions via the approximately triangularly shaped pads.

13. Apparatus according to claim 12, wherein the heating member is made of metal, a metallic support member is disposed adjacent the lower surface of the heating pads, and heat conductive fastening means connect the metallic support member to the pyramid-shaped member and form heat conductive paths therebetween.

14. Apparatus according to claim 11, wherein the means for heating the inner surface of said flangelike member includes heat conductive members connecting said flangelike member to said pyramid-shaped member.

15. Apparatus according to claim 11, wherein the pyramid-shaped member comprises a depending generally vertically disposed flange portion, said flangelike member is disposed generally in parallel with said depending flange portion, and the bottoms of the flangelike member and the depending flange portion terminate at different vertical positions.

16. Apparatus according to claim 15, wherein said means mounting said flangelike member connects said member to said hopper and includes insulating means thermally insulating said flangelike member from said hopper.

17. Apparatus according to claim 16, wherein said electrical heating means is adapted to cause said trapezoidal heating pads to bring the lower surface portions to a temperature sufficient to melt the solidified material before the upper surface portions reach such temperature.

18. Apparatus according to claim 1, wherein said electrical heating means comprises means for heating a lower portion of the upper surface of said heating member to a temperature sufficient to melt said solidified material before the remaining upper portion of said upper surface is brought to such temperature.